United States Patent
Hyde et al.

(10) Patent No.: US 10,074,047 B2
(45) Date of Patent: *Sep. 11, 2018

(54) TIME-DEPENDENT IDENTIFICATION SYSTEMS, METHODS, AND USES THEREOF

(71) Applicant: Elwha LLC, Bellevue, WA (US)

(72) Inventors: Roderick A. Hyde, Redmond, WA (US); Tony S. Pan, Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/724,077

(22) Filed: Oct. 3, 2017

(65) Prior Publication Data

US 2018/0129921 A1    May 10, 2018

Related U.S. Application Data

(63) Continuation of application No. 14/470,654, filed on Aug. 27, 2014, now Pat. No. 9,779,346.

(51) Int. Cl.
*G06K 19/06* (2006.01)
*B41M 3/14* (2006.01)

(52) U.S. Cl.
CPC ........... *G06K 19/0615* (2013.01); *B41M 3/14* (2013.01); *G06K 19/06046* (2013.01)

(58) Field of Classification Search
CPC  G06K 19/0615; G06K 19/06046; B41M 3/14
USPC ...... 235/494, 487, 492, 462.04, 462.09, 491
See application file for complete search history.

(56) References Cited

U.S. PATENT DOCUMENTS

| | | |
|---|---|---|
| 5,058,088 A | 10/1991 | Haas et al. |
| 5,364,132 A | 11/1994 | Haas et al. |
| 5,446,705 A | 8/1995 | Haas et al. |
| 5,600,443 A | 2/1997 | Frey et al. |
| 5,602,804 A | 2/1997 | Haas |
| 5,699,326 A | 12/1997 | Haas et al. |
| 5,715,215 A | 2/1998 | Haas et al. |
| 5,719,828 A | 2/1998 | Haas et al. |
| 5,759,246 A | 6/1998 | Frey et al. |
| 5,785,354 A | 7/1998 | Haas |
| 5,822,280 A | 10/1998 | Haas |
| 5,862,101 A | 1/1999 | Haas et al. |

(Continued)

OTHER PUBLICATIONS

Garun, Natt, "Book Printed With Disappearing Ink Needs You to Read Before Its Expiration Date", http://www.digitaltrends.com/home/the-book-that-cant-wait/, Aug. 6, 2012, visited Sep. 3, 2014.

*Primary Examiner* — Karl D Frech

(57) ABSTRACT

The present disclosure provides for identification systems and related methods of use. The disclosed identification systems can include a first ink and a second ink, each of which can comprise one or more time-dependent properties. The first and second inks can be disposed in a spatial pattern on a substrate. Illustrative spatial patterns include, but are not limited to, QR codes and other barcodes, text, images, and icons. A time-dependent property of the first ink and a time-dependent property of the second ink can cause a characteristic of the spatial pattern to change over time. For example, the spatial pattern can change from a first state at a first time to a second state at a second time. Evaluation and/or interpretation of the state of the spatial pattern at a second time can provide information about a product.

41 Claims, 6 Drawing Sheets

(56) References Cited

U.S. PATENT DOCUMENTS

| | | |
|---|---|---|
| 5,873,606 A | 2/1999 | Haas et al. |
| 5,930,206 A | 6/1999 | Haas et al. |
| 5,923,763 A | 7/1999 | Walker et al. |
| 5,957,458 A | 9/1999 | Haas et al. |
| 6,263,438 B1 | 7/2001 | Walker et al. |
| 6,752,430 B2 | 6/2004 | Holt et al. |
| 6,869,015 B2 | 3/2005 | Cummings et al. |
| 7,001,091 B1 | 2/2006 | Knight |
| 7,172,113 B2 | 2/2007 | Olenick et al. |
| 7,255,508 B1 | 8/2007 | Knight |
| 7,534,476 B2 | 5/2009 | Banks et al. |
| 7,754,273 B2 | 7/2010 | Reichert et al. |
| 8,204,835 B1 | 6/2012 | Ogg |
| 9,779,346 B2 * | 10/2017 | Hyde ................ G06K 19/0615 |
| 2002/0105183 A1 | 8/2002 | Holt et al. |
| 2003/0098357 A1 | 5/2003 | Cummings et al. |
| 2004/0099731 A1 | 5/2004 | Olenick et al. |
| 2006/0070434 A1 | 4/2006 | Yu |
| 2007/0218206 A1 | 9/2007 | Reichert et al. |
| 2009/0308922 A1 | 12/2009 | Chaum |
| 2012/0041887 A1 | 2/2012 | Hurme et al. |
| 2012/0080877 A1 | 4/2012 | Downing |
| 2012/0132713 A1 | 5/2012 | Chaum |
| 2012/0162701 A1 | 6/2012 | Villwock |

\* cited by examiner

TIME-DEPENDENT IDENTIFICATION SYSTEMS, METHODS, AND USES THEREOF

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications, or claims benefits under 35 USC § 119(e) for provisional patent applications, for any and all parent, grandparent, great-grandparent, etc. applications of the Priority Application(s)).

PRIORITY APPLICATIONS

This application is a continuation of U.S. patent application Ser. No. 14/470,654, fled Aug. 27, 2014, for "Time-Dependent Identification Systems, Methods, and Uses Thereof," now U.S. Pat. No. 9,779,346, which is incorporated herein by reference in its entirety.

If the listings of applications provided above are inconsistent with the listings provided via an ADS, it is the intent of the Applicant to claim priority to each application that appears in the Domestic Benefit/National Stage Information section of the ADS and to each application that appears in the Priority Applications section of this application.

All subject matter of the Priority Applications and of any and all applications related to the Priority Applications by priority claims (directly or indirectly), including any priority claims made and subject matter incorporated by reference therein as of the filing date of the instant application, is incorporated herein by reference to the extent such subject matter is not inconsistent herewith.

TECHNICAL FIELD

This disclosure relates to identification systems, methods, and uses thereof. Specifically, this disclosure relates to identification systems that include time-dependent inks.

SUMMARY

The present disclosure is related to identification systems, methods, and uses thereof. As detailed below, the identification systems can comprise a plurality of inks comprising time-dependent properties. The plurality of time-dependent inks can be disposed in a spatial pattern on a substrate. Illustrative spatial patterns include, but are not limited to, QR codes and other barcodes, text, images, and icons. The time-dependent properties of the inks can cause a characteristic of the spatial pattern to change over time. For example, the spatial pattern can change from a first state at a first time to a second state at a second time. Interpretation of the spatial pattern in the second state and/or at a second time can provide identifying information about the spatial pattern and/or a product associated therewith.

Various characteristics of the time-dependent inks and/or the spatial pattern can change over time, including, but not limited to, color, reflectivity, and location. For example, the time-dependent inks can change from visible colors to other visible colors, non-visible colors to other non-visible colors, or visible colors to non-visible colors, and vice versa. The reflectivity of the time-dependent inks and/or the spatial pattern can also change. The location of the time-dependent inks and/or the spatial pattern can also change from location to another.

In some embodiments, the characteristics of the time-dependent inks can change due to an atmospheric reaction. For example, the characteristics of the time-dependent inks can change due to oxidation reactions and/or evaporation reactions. In other embodiments, the characteristics of the time-dependent inks can change due to chemical reactions comprising one or more components of the inks.

Information can be derived from the spatial pattern at any time. For example, information can be determined by evaluating and/or interpreting the state of the spatial pattern at a given time. Interpretation of the spatial pattern can be accomplished by visual inspection of the spatial pattern. For example, the spatial pattern can be viewed and/or compared with a control or standard image. Interpretation of the spatial pattern also can be accomplished by a computing device, such as a smart phone. For example, a computing device can scan or capture an image of the spatial pattern, submit the spatial pattern to a website, and provide identifying information about the spatial pattern and/or a product associated therewith.

In certain embodiments, the spatial pattern can be evaluated to determine whether the spatial pattern is authentic. In some embodiments, a date can be encoded in the spatial pattern. The date can correspond to various events, including, but not limited to, the date on which the inks were disposed on the substrate, the manufacturing date of a product, the packaging date of the product, and an expiration date of a product. Other dates and/or information can also be encoded in the spatial pattern.

In some embodiments, the spatial pattern further comprises one or more reference inks. The reference inks can be static inks, or inks that are substantially devoid of time-dependent properties. The reference inks can be used as a baseline reference for interpreting the characteristic change of the time-dependent inks. In some embodiments, the reference inks can include temperature calibration inks. The reference inks can also include anti-counterfeiting characteristics. These and other embodiments are described in detail below.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1B:
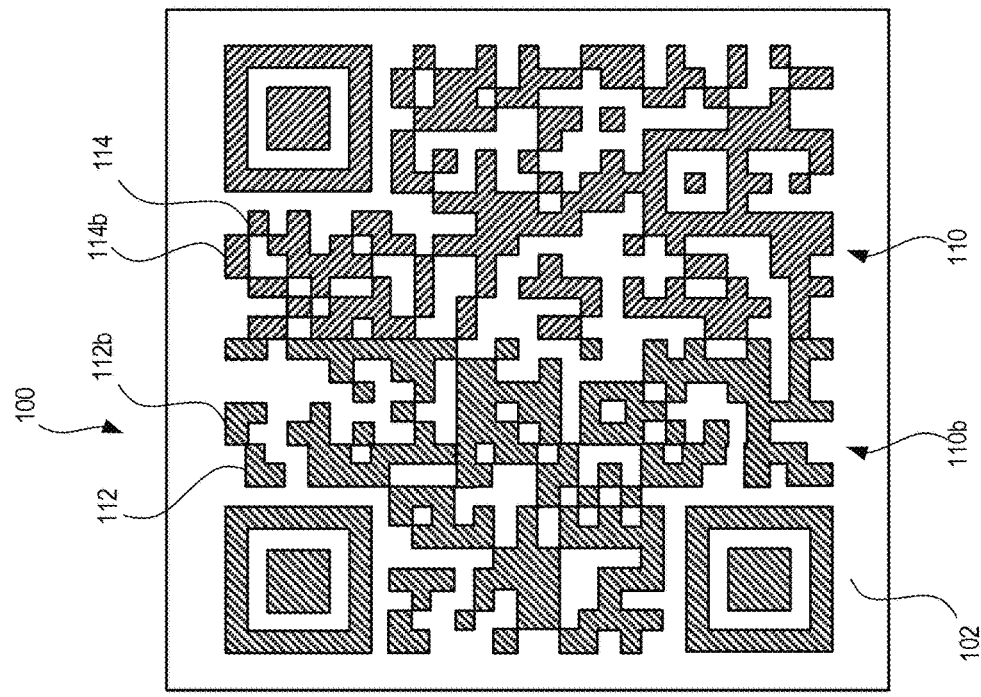
FIGS. 1A-1B are schematic illustrations of an identification system, according to an embodiment of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Thus, the following detailed description of the embodiments of the systems and methods of the disclosure is not intended to limit the scope of the disclosure, as claimed, but is merely representative of possible embodiments. In addition, the steps of a method do not necessarily need to be executed in any specific order, or even sequentially, nor do the steps need to be executed only once.

The present disclosure is related to identification systems, methods, and uses thereof. As detailed below, the identification systems can comprise a plurality of inks comprising time-dependent properties. The plurality of time-dependent inks can be disposed in a spatial pattern on a substrate. Illustrative spatial patterns include, but are not limited to, QR codes and other barcodes, text, images, and icons. The time-dependent properties of the inks can cause a characteristic of the spatial pattern to change over time. For example, the spatial pattern can change from a first state at a first time to a second state at a second time. Interpretation of the spatial pattern in the second state and/or at a second time can provide identifying information about the spatial pattern and/or a product associated therewith. In some circumstances, the presence of a time varying spatial pattern can make an identification system harder to counterfeit, as a simple static counterfeit pattern can only be "correct" at a single time, and a "successful" counterfeit must match not only a single value of the spatial pattern, but its time dependent progression as well.

Various characteristics of the time-dependent inks and/or the spatial pattern can change over time, including, but not limited to, color, reflectivity, and location. For example, the time-dependent inks can change from visible colors to other visible colors, non-visible colors to other non-visible colors, or visible colors to non-visible colors, and vice versa. The reflectivity of the time-dependent inks and/or the spatial pattern can also change. The location of the time-dependent inks and/or the spatial pattern can also change from location to another.

In some embodiments, the characteristics of the time-dependent inks can change due to an atmospheric reaction. For example, the characteristics of the time-dependent inks can change due to oxidation reactions and/or evaporation reactions. In other embodiments, the characteristics of the time-dependent inks can change due to chemical reactions comprising one or more components of the inks.

Information can be derived from the spatial pattern at any time. For example, information can be determined by evaluating and/or interpreting the state of the spatial pattern at a given time. Interpretation of the spatial pattern can be accomplished by visual inspection of the spatial pattern. For example, the spatial pattern can be viewed and/or compared with a control or standard image. Interpretation of the spatial pattern also can be accomplished by a computing device, such as a smart phone. For example, a computing device can scan or capture an image of the spatial pattern, submit the spatial pattern to a website, and provide identifying information about the spatial pattern and/or a product associated therewith. In some embodiments, the website can compare the received spatial pattern to a database or program determination of what the spatial pattern should be (e.g., given the image date, the printing date, the ink characteristics, etc.) and provide a determination as to whether the marked item is counterfeit or not.

In certain embodiments, the spatial pattern can be evaluated to determine whether the spatial pattern is authentic. In some embodiments, a date can be encoded in the spatial pattern. The date can correspond to various events, including, but not limited to, the date on which the inks were disposed on the substrate, the manufacturing date of a product, the packaging date of the product, and an expiration date of a product. Other dates and/or information can also be encoded in the spatial pattern.

In some embodiments, the spatial pattern further comprises one or more reference inks. The reference inks can be static inks, or inks that are substantially devoid of time-dependent properties. The reference inks can be used as a baseline reference for interpreting the characteristic change of the time-dependent inks. In some embodiments, the reference inks can include temperature calibration inks. The reference inks can also include anti-counterfeiting characteristics. These and other embodiments are described in detail below.

Figure 1A:
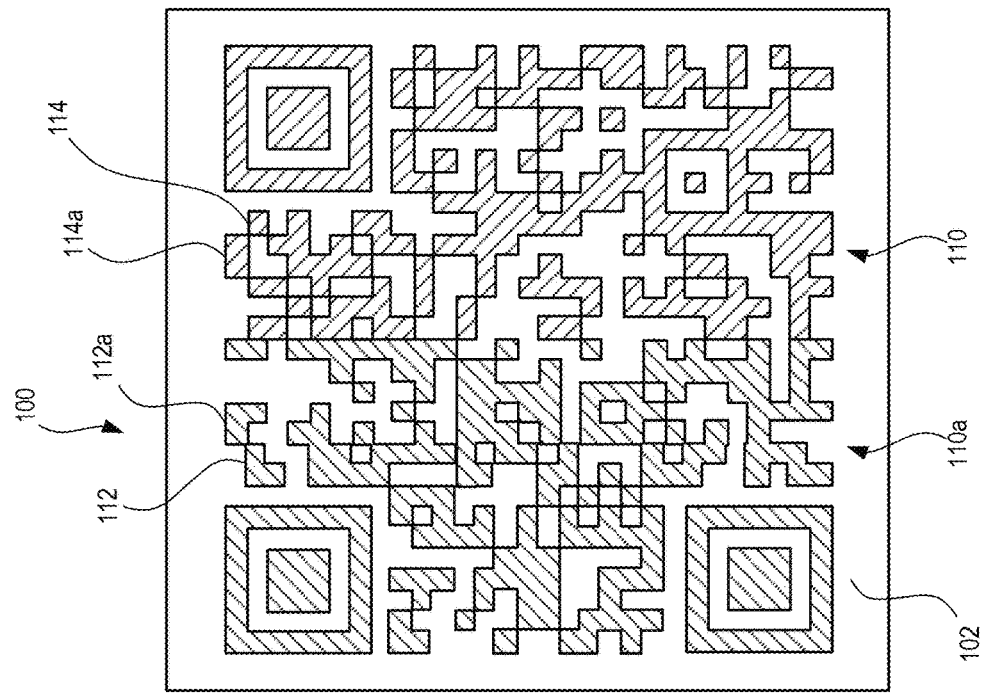

FIGS. 1A-1B are schematic illustrations of an identification system 100, according to an embodiment of the present disclosure. As shown in FIGS. 1A-1B, the identification system 100 can comprise a plurality of inks 112, 114 disposed in a spatial pattern 110 on a substrate 102. For example, in the illustrated embodiment, the identification system 100 comprises a first ink 112 and a second ink 114. Additional inks (e.g., third, fourth, fifth, etc.) can also be used. The inks 112, 114 can each comprise one or more time-dependent properties. Time-dependent properties are properties that vary or change as a function of time. In such embodiments, the inks 112, 114 can be referred to as time-dependent inks 112, 114.

In some embodiments, the time-dependent properties of the inks 112, 114 are different. For example, a time-dependent property of a first ink 112 can differ from a time-dependent property of a second ink 114. In such embodiments, one portion of the spatial pattern 110 can change over time differently than another portion of the spatial pattern 110. In other embodiments, the time-dependent properties of the inks 112, 114 are substantially the same. In still other embodiments, at least one time-dependent property of a first ink 112 differs from at least one time-dependent property of a second ink 114, and at least one time-dependent property of the first ink 112 is substantially the same as at least one time-dependent property of the second ink 114.

The time-dependent properties of the inks 112, 114 each can comprise, or otherwise be associated with, a rate of progression. The rate of progression is the rate at which a time-dependent property changes as a function of time (e.g., change/time (seconds, minutes, hours, days, years, etc.)). In some embodiments, the rate of progression of the time-dependent properties of the inks 112, 114 is known. For example, the rate of progression can be known at specified conditions (e.g., temperatures and pressures), including, but not limited to, Standard Temperature and Pressure Conditions ("STP") (0° C. and 100 kPa) and Standard Ambient Temperature and Pressure Conditions ("SATP") (25° C. and 100 kPa). The rate of progression can also be known, or otherwise derived for, other conditions. As can be appreciated, the rate of progression can be relatively fast, or relatively slow as desired.

In some embodiments, a known rate of progression can be used to identify or otherwise determine information about the inks 112, 114 and/or the spatial pattern 110. For example, by knowing the rate of progression, the inks 112, 114 and/or the spatial pattern 110 can be analyzed or otherwise evaluated at any given time to determine the date on which the ink 112, 114 and/or the spatial pattern 110 was disposed on the substrate 102. Other information about the inks 112, 114 and/or the spatial pattern 110 can also be derived by knowing the rate of progression, as detailed below.

In some embodiments, the rate of progression of the time-dependent properties of the inks 112, 114 is different. For example, the rate of progression of a time-dependent property of a first ink 112 can differ from the rate of progression of a time-dependent property of a second ink 114. In other embodiments, the rate of progression of the time-dependent properties of the inks 112, 114 is substantially the same. In still other embodiments, the rate of progression of at least one time-dependent property of a first ink 112 differs from the rate of progression of at least one time-dependent property of a second ink 114, and the rate of progression of at least one time-dependent property of the first ink 112 is substantially the same as the rate of progression of at least one time-dependent property of the second ink 114.

In some embodiments, the rate of progression of the time-dependent properties of the inks 112, 114 is variable or otherwise capable of being varied or changed. For example, the rate of progression of a time-dependent property of an ink 112, 114 can be configured to be relatively fast, or relatively slow, depending on the desired use of the identification system 100. For instance, if an identification system 100 is used to authenticate a product being mailed, a relatively fast rate of progression may be desired. If an identification system 100 is used to authenticate currency or indicate that a product has expired, a relatively slow rate of progression may be desired.

The rate of progression of the time-dependent properties of the ink 112, 114 can be varied by modifying one or more components of the ink 112, 114. For example, one or more reagents or other compounds can be added that can accelerate or decelerate the rate of progression. In some embodiments, the one or more components of the ink 112, 114 can be modified prior to disposing the ink 112, 114 on the substrate 102. In other embodiments, the one or more components of the ink 112, 114 are modified while the ink 112, 114 is being disposed on the substrate 102. For example, one or more components of the ink 112, 114 can be mixed with additional reagents or compounds while the ink 112, 114 is being disposed on the substrate 102. In yet other embodiments, one or more components of the ink 112, 114 can be modified after the ink 112, 114 has been disposed on the substrate 102. For example, a reagent or other compound can be applied to an ink 112, 114 that has previously been disposed on a substrate 102.

As can be appreciated, varying the rate of progression of a time-dependent property of an ink 112, 114 can vary the rate of change of a particular characteristic of the ink 112, 114 and/or the spatial pattern 110. For example, increasing the rate of progression of a time-dependent property of an ink 112, 114 can increase the rate of change of a characteristic of the ink 112, 114 and/or the spatial pattern 110. Analogously, decreasing the rate of progression of a time-dependent property of an ink 112, 114 can decrease the rate of change of a characteristic of the ink 112, 114 and/or the spatial pattern 110. In some embodiments, the rate of progression can be varied, or otherwise configured, such that a characteristic of an ink 112, 114 and/or the spatial pattern 110 changes to a particular state on a predetermined date, for example, to authenticate a product or indicate that an expiration date has passed.

In some embodiments, the time-dependent properties of the inks 112, 114 can be described in relation to a characteristic change that is taking place with the ink 112, 114 and/or the spatial pattern 110. In particular, the time-dependent properties of the inks 112, 114 can cause various characteristics of the inks 112, 114 and/or the spatial pattern 110 to change over time. For example, a time-dependent property of an ink 112, 114 can cause a characteristic of an ink 112, 114 and/or the spatial pattern 110 to change from one state at a first time to another state at a second time. For convenience, a first time and a second time can be used to reference and distinguish between two different times. However, it will be appreciated that the first time and the second time are not intended to be limiting in any way. For example, the first time and second time are not associated with any fixed date or event, but can be representative of any time. In some embodiments, the first time can be representative of the time at which the inks 112, 114 were disposed on the substrate 102.

Additionally, throughout this disclosure, reference may be made to a particular state (e.g., first, second, third, fourth, etc.). For example, reference may be made to a spatial pattern 110 being in a first state at a first time and a second state at a second time. Analogously, reference may also be made to a first ink 112 being in a third state at the first time and a fourth state at the second time, and reference may be made to the second ink 114 being in a fifth state at the first time and a sixth state at the second time. The recitation of particular states may be merely used to differentiate between other states (e.g., a state of the spatial pattern 110, a state of the first ink 112, and a state of a second ink 114), and is not intended to be limiting in any way. For example, the recitation of a particular state is not intended to indicate the existence of other states. Thus, recitation of a third state does not indicate the existence of a first, second, or fourth state, etc. And the recitation of a state is not intended to indicate that the ink 112, 114 and/or spatial pattern 110 is in a fixed state. Rather, the recitation of a state is merely indicative of the current state of an ink 112, 114 and/or the spatial pattern 110 at a particular time, and the ink 112, 114 and/or the spatial pattern 110 can continue to change as time progresses.

It will also be appreciated that reference to a particular state need not be mentioned. For example, discussion of an ink 112, 114 and/or the spatial pattern 110 at a particular time can imply that the ink 112, 114 and/or the spatial pattern 110 is in a particular state. For example, discussion of an ink 112, 114 and/or the spatial pattern 110 at a first time or second time can imply that the ink 112, 114 and/or the spatial pattern in is one state at the first time and another state at the second time. Thus, changes in the ink 112, 114 and/or the spatial pattern 110 from one time to another can also imply changes from one state to another state.

Illustrative changes to characteristics of the inks 112, 114 and/or the spatial pattern 110 over time are depicted in FIGS. 1A-1B. In FIG. 1A, the inks 112, 114 and the spatial pattern 110 are depicted at a first time. At the first time, the spatial pattern 110a can be described as being in a first state, the first ink 112a can be described as being in a third state, and the second ink 114a can be described as being in a fifth state. The time-dependent properties of the inks 112, 114 cause the inks 112, 114 and the spatial pattern 110 to change as time progresses, as depicted in FIG. 1B. At the second time, depicted in FIG. 1B, the spatial pattern 110b can be described as being in a second state, the first ink 112b can be described as being in a fourth state, and the second ink 114b can be described as being in a sixth state. As can be appreciated, and as also shown in FIGS. 1A-1B, the spatial pattern 110, which comprises the inks 112, 114, can change from one state to another state (e.g., a first state to a second state) as the inks 112, 114 change from one state to another state (e.g., a third state to a fourth state, and a fifth state to a sixth state). Thus, any disclosure herein relating to the inks 112, 114 individually is also applicable to the spatial pattern 110 or at least a portion of the spatial pattern 110.

Illustrative characteristics of the inks 112, 114 and/or the spatial pattern 110 that can be affected and/or changed by the time-dependent properties of the inks 112, 114 include, but are not limited to, color, reflectivity, and location. For example, in one embodiment, a characteristic of an ink 112, 114 and/or spatial pattern 110 that is affected by the time-dependent property of the ink 112, 114 comprises color. Specifically, the color of an ink 112, 114 can change from one color at the first time to another color at the second time.

In some embodiments, the color of at least one ink 112, 114 changes from one visible color to another visible color. Typically, a visible color is a color that is in the spectrum (i.e., visible spectrum) that can be detected by the human eye. The visible spectrum typically includes wavelengths between about 390 nm and about 700 nm, but other wavelengths visible to the human eye can also be included. In other embodiments, the color of at least one ink 112, 114 changes from a non-visible color to another non-visible color. Non-visible colors include infrared wavelengths (e.g., greater than about 700 nm) and ultraviolet wavelengths (e.g., less than about 390 nm). In yet another embodiment, the color of at least one ink 112, 114 changes from one visible color to a non-visible color, or vice versa.

Combinations of the above-mentioned color changes are also contemplated. For example, in further embodiments, the color of one ink 112, 114 changes from one visible color to another visible color, and the color of another ink 112, 114 changes from one non-visible color to another non-visible color. In other embodiments, the color of each ink 112, 114 changes from one visible color to another visible color, or the color of each ink 112, 114 changes from one non-visible color to another non-visible color. In still further embodiments, the color of one ink 112, 114 changes from one visible color to a non-visible color (or vice versa), and the color of another ink 112, 114 changes from one visible color to another visible color (or one non-visible color to another non-visible color).

In another embodiment, a characteristic of the ink 112, 114 and/or spatial pattern 110 that is affected by the time-dependent properties of the inks 112, 114 comprises reflectivity. For example, the reflectivity of an ink 112, 114 can change from one reflectivity at a first time to another reflectivity at a second time. In some embodiments, the reflectivity of an ink 112, 114 increases over time. In other embodiments, the reflectivity of an ink 112, 114 decreases over time. In other words, the reflectivity of an ink 112, 114 at a first time can be greater than the reflectivity of the ink 112, 114 at a second time, and vice versa. Changes in reflectivity can manifest as an overall brightening of the ink 112, 114 (e.g., increasing reflectivity), or an overall fading of the ink 112, 114 (e.g., decreasing reflectivity). In particular embodiments, the reflectivity of an ink 112, 114 changes from one polarization (or polarization dependence) at a first time to another polarization (or polarization dependence) at a second time.

The reflectivity can comprise various components, including, but not limited to, specular and diffuse components, that can change over time. For example, in some embodiments, a specular component (or specular reflection) of the reflectivity at a first time is greater than the specular component (or specular reflection) of the reflectivity at a second time. In other embodiments, a specular component (or specular reflection) of the reflectivity at a first time is less than the specular component (or specular reflection) of the reflectivity at a second time. In other words, the specular component of the reflectivity (e.g., a first reflectivity) of an ink 112, 114 at a first time can be greater than the specular component of the reflectivity (e.g., a second reflectivity) of an ink 112, 114 at a second time, and vice versa. Analogously, the diffuse component of the reflectivity of an ink 112, 114 at a first time can be greater than the diffuse component of the reflectivity of an ink 112, 114 at a second time, and vice versa.

The reflectivity can also be described as including a refractivity or refractive component. The refractivity, or refractive component, can also be quantified by itself, independent of the reflectivity. The refractivity, or refractive component of an ink 112, 114 can change over time. For example, the refractivity of an ink 112, 114 can comprise one refractivity at a first time and another refractivity at a second time. More specifically, the refractivity (e.g., a first refractivity) of an ink 112, 114 at a first time can be greater than the refractivity (e.g., a second refractivity) of the ink 112, 114 at a second time. In other embodiments, the refractivity of an ink 112, 114 at a first time can be less than the refractivity of the ink 112, 114 at a second time.

The diffractive component of the ink 112, 114 can also change in an analogous manner. For example, the diffractive component of an ink 112, 114 at a first time can be greater than the diffractive component of the ink 112, 114 at a second time. And in other embodiments, the diffractive component of an ink 112, 114 at a first time can be less than the diffractive component of the ink 112, 114 at a second time. Examples of inks with diffractive components can be seen in U.S. Pat. No. 5,912,767, titled 'Diffractive Indicia for a Surface,' filed Nov. 23, 1994, and U.S. Pat. No. 7,729,026, titled 'Security Device with Metameric Features Using Diffractive Pigment Flakes,' filed Dec. 12, 2006, each of which is incorporated by reference in its entirety.

In yet another embodiment, a characteristic of the ink 112, 114 that is affected by the time-dependent property comprises location, e.g., a spatial location in the spatial pattern 110 on the substrate 102. For example, a portion of the ink 112, 114 can be disposed at one location at a first time, and another location at a second time, as detailed below.

The characteristic changes of the inks 112, 114 can be caused by many things. For example, in some embodiments, the characteristic change of the inks 112, 114 can be caused by, or otherwise attributed to, one or more reactions. Illustrative reactions include, but are not limited to, atmospheric reactions and chemical reactions. In some embodiments, the reactions can progress relatively slowly over time such that the ink 112, 114 appears to change indefinitely. In other embodiments, the reactions can progress relatively quickly.

In certain embodiments, the characteristic of ink 112, 114 changes due to an atmospheric reaction comprising one or more components of the ink 112, 114. Illustrative types of atmospheric reactions include, but are not limited to, oxidation reactions and evaporation reactions. For example, U.S. Pat. No. 5,759,246, titled 'Ink with Time Dependent Characteristics,' filed Dec. 17, 1996, which is incorporated by reference in its entirety, discusses a variety of inks which change color due to pH shifts caused by the evaporation of one component of the ink. One example of such an ink involves a phenolsulfonphthalein dye (phenol red) whose color changes from red to yellow depending on pH. The pH can be determined by a solvent in the ink; for instance, triethanolamine is an alkaline solvent that slowly evaporates, changing the ink's pH and hence its color from red to yellow. This patent discuss a variety of dyes and solvents involving different color shifts occurring over different time scales. U.S. Pat. No. 5,759,246 also discusses a variety of inks which change color due to oxidation. One example of such an ink involves a combination of an unstable dye such as rhodamine B in a stable solvent such copper phthalocyanine. For example, in some embodiments, the ink 112, 114 can oxidize by interacting with the air, or components (e.g., oxygen) in the air. In other embodiments, the characteristic of the ink 112, 114 can change as portions of the ink 112, 114 evaporate. For example, liquid components of the ink 112, 114 can evaporate or otherwise vaporize, causing a characteristic of the ink 112, 114 to change.

In various embodiments, the characteristics of the ink 112, 114 change due to a chemical reaction comprising one or more components of the ink 112, 114. Examples of such reactions for use in color changing inks can be found in European Patent Application No. EP 0 117 390, titled 'Process for Monitoring Incremental Environmental Exposures of Products that Undergo Progressive Quality Changes in Response to Environment Stimuli,' filed Jan. 3, 1984, which is incorporated by reference in its entirety, based on diacetylene materials; International Patent Publication No. WO 1999039197, titled 'Substrate for Packaging Perishable Goods or for Application onto Same and Method for Determining the Quality of Said Goods,' filed Jan. 27, 1999, which is incorporated by reference in its entirety, describing a reversible indicator having photochromic properties based on transfer reactions; and U.S. Pat. No. 7,754,273, titled 'Method of Printing a Time-Temperature Indicator Based on Azo Coupling Reactions onto a Susbtrate [sic],' filed Aug. 3, 2005, which is incorporated by reference in its entirety, based on azo coupling reactions. For example, a chemical reaction can comprise a reaction between a first component of an ink 112, 114 and a second component of the ink 112, 114. U.S. Pat. No. 7,255,508, titled 'Writing System and Ink Pen Having Time-Dependent Characteristics,' filed Dec. 7, 2005, which is incorporated by reference in its entirety, discusses a number of such inks, some of which involve mixtures of oxidizer and reducer components. In some embodiments, the components (e.g., first and second components) are mixed together prior to being disposed in a spatial pattern 110 on the substrate 102. In other embodiments, the components can be mixed together while being disposed in the spatial pattern 110 on the substrate 102. In yet other embodiments, the components can mix or otherwise interact with each other after they are disposed on the substrate 102, or as they are disposed on the substrate 102. For example, the components of the ink 112, 114 can be disposed at substantially similar locations (e.g., pixel locations) on the substrate 102, such that they interact with one another on the substrate 102. The components of the ink 112, 114 can also be disposed at adjacent locations on the substrate 102 such that they interact with each other after being disposed on the substrate 102. For example, a first component of an ink 112, 114 can be disposed at a first location on the substrate 102 and a second component of the ink 112, 114 can be disposed at a second location on the substrate 102 that is adjacent to the first location such that the first and second components of the ink 112, 114 interact with each other on the substrate 102.

In other embodiments, the characteristics of the ink 112, 114 change due to a chemical reaction comprising one or more components of a first ink 112 and one or more components of a second ink 114. The components of the inks 112, 114 can be mixed together prior to being disposed in a spatial pattern 110 on the substrate 102. In other embodiments, the components of the inks 112, 114 can be mixed together while being disposed in the spatial pattern 110 on the substrate 102. In yet other embodiments, the components of the inks 112, 114 can mix or otherwise interact with each other after they are disposed on the substrate 102, or as they are disposed on the substrate 102. For example, the components of the inks 112, 114 can be disposed at substantially similar locations (e.g., pixel locations) on the substrate 102, such that they interact with one another on the substrate 102. The components of the inks 112, 114 can also be disposed at adjacent locations on the substrate 102 such that they interact with each other after being disposed on the substrate 102. For example, a component of a first ink 112 can be disposed at a first location on the substrate 102 and a component of a second ink 114 can be disposed at a second location on the substrate 102 that is adjacent to the first location such that the components of the first and second inks 112, 114 interact with each other on the substrate 102.

In still other embodiments, the characteristic of the ink 112, 114 changes due to a chemical reaction between one or more components of the ink 112, 114 and a component of the substrate 102. For example, a component of the ink 112, 114 can interact with a component of the substrate 102 after being disposed on the substrate 102.

In some embodiments, the characteristic of the ink 112, 114 begins changing the moment the ink 112, 114 is disposed on the substrate 102. In other embodiments, the characteristic of the ink 112, 114 begins changing before the ink 112, 114 is disposed on the substrate 102. In yet other embodiments, the characteristic of the ink 112, 114 begins changing at a specified time (or event) after the ink 112, 114 has been disposed on the substrate 102. For example, in some embodiments, a seal may be used to cover the ink 112, 114, which can be disposed on a substrate 102, until a specified time (or event) (e.g., a packaging date, a shipping date, etc.). At the specified time (or event) (e.g., the packaging date, a shipping date, etc.), the seal may be removed from the ink 112, 114, or otherwise broken, causing the characteristic of the ink 112, 114 to begin changing at the specified time (or event) (e.g., the packaging date, the shipping date, etc.). For example, the ink 112, 114 can begin changing due to an atmospheric reaction (e.g., reaction with oxygen, air, water vapor, etc.) after the seal has been removed or otherwise broken. In such embodiments, the seal can comprise a thin plastic film or other covering that can protect the ink 112, 114 from reacting or otherwise changing prior to the specified time (or event) (e.g., the packaging date, the shipping date, etc.). As can be appreciated, the specified time (or event) can be any time at the user's discretion.

Other methods of delaying the change in the characteristic of the ink 112, 114 can also be used. For example, in some embodiments, the ink 112, 114 can be disposed on the substrate 102 in a dry powder form. At a specified time (or event) (e.g., a packaging date, a shipping date, etc.), the ink 112, 114 can be dipped into a liquid, or a liquid can be applied to the ink 112, 114, causing the characteristic of the ink 112, 114 to begin changing. In still other embodiments, a reagent (e.g., a liquid reagent) can be applied to an ink 112, 114 at a specified time (or event) (e.g., a packaging date, a shipping date, etc.), causing the characteristic of the ink 112, 114 to begin changing. In such embodiments, the liquid or reagent can be held in a separate reservoir until being released or applied onto the ink 112, 114.

Delaying the time-dependent property, or characteristic change, of the ink 112, 114 can be useful in many instances. For example, delaying the time-dependent property, or characteristic change, of the ink 112, 114 can be useful in situations where the ink 112, 114 is disposed on the substrate 102 prior to, for example, shipping, packaging, delivering, or manufacturing a product. For example, in some embodiments, a product may be packaged long before it is shipped or delivered. In another example, the ink 112, 114 may be disposed on a substrate 102 used for packaging prior to placing a product in the package. In other embodiments, one company may dispose the ink 112, 114 onto a substrate 102, and another company may use the substrate 102 to label (or package) their product. As can be appreciated, other situations are also contemplated.

In some embodiments, the inks 112, 114 can comprise known time- and temperature-related information. In such embodiments, information about the temperature of the inks 112, 114 can be derived from evaluation of a characteristic of the ink 112, 114 at a second time. For example, in some embodiments, evaluation and/or interpretation of the state of the characteristic of an ink 112, 114 at a second time can provide information about whether the temperature of the ink 112, 114 and/or the spatial pattern 110 exceeded a threshold temperature between the first time and the second time. For example, in some embodiments, evaluation and/or interpretation of a characteristic of the ink 112, 114 provides information about whether the temperature of the ink 112, 114 was heated above a threshold temperature. In other embodiments, evaluation and/or interpretation of a characteristic of the ink 112, 114 provides information about whether the temperature of the ink 112, 114 was cooled below a threshold temperature. As can be appreciated, any of the above-mentioned characteristics of the inks 112, 114 can change when a threshold temperature has been exceeded, including, for example, the color of the ink 112, 114.

In some embodiments, the temperature-related information derived from the inks 112, 114 can provide calibration information for interpreting changes to the spatial pattern 110. For example, temperature-related information and/or calibration information can provide a baseline for differentiating between changes in the spatial pattern 110 that are caused by temperature (or temperature fluctuations) and changes that are caused by time.

Temperature-related information can be derived from the inks 112, 114 in various ways. For example, a computing device can evaluate the state of a characteristic of the ink 112, 114 at a second time and isolate temperature-related information from the ink 112, 114. The temperature-related information can then be subtracted from the change in the spatial pattern 110, minimizing the effects of temperature on the changes to the spatial pattern 110. In some embodiments, a temperature stable ink can be employed by combining two inks having opposite temperature coefficients for at least one specified characteristic (e.g., color or reflectivity). The specified characteristic of this ink will vary with respect to time, but not with temperature, (within a specified range of temperatures). One or more reference inks can also be used to derive a baseline and/or temperature-related information, as detailed below.

The plurality of inks 112, 114 can be disposed on various substrates 102, including, but not limited to, packaging materials, labels, pharmaceutical medications, legal documents, confidential documents, currency, lottery tickets, and products and/or portions of products or items. The plurality of inks 112, 114 can also be disposed on the substrate 102 in various ways. For example, the plurality of inks 112, 114 can be printed on the substrate 102. The plurality of inks 112, 114 can also be stamped onto the substrate. Other ways of disposing the plurality of inks 112, 114 on the substrate 102 can also be employed.

The plurality of inks 112, 114 can also be disposed in various spatial patterns 110 on the substrate 102. In some embodiments, the spatial pattern 110 is a predetermined pattern. In the predetermined pattern, a first ink 112 (or a portion thereof) can be disposed at a first location on the substrate 102, and a second ink 114 (or a portion thereof) can be disposed at a second location on the substrate 102. The first and second locations can be different. For example, the first location and the second location can be at different pixel locations. In other embodiments, the first and second locations can be at a substantially similar location (e.g., similar pixel location). In such embodiments, any difference between the first and second locations can be minimal and/or non-resolvable by visual inspection by a human.

In some embodiments, the spatial pattern 110 can be machine readable. For example, the spatial pattern 110 can be scanned and/or photographed. The spatial pattern 110 can be scanned and/or photographed with various types of computing devices, including, but not limited to, scanners and smart phones.

In some embodiments, such as the illustrated embodiment of FIGS. 1A-1B, the spatial pattern 110 can comprise a quick response code (i.e., QR code). Other spatial patterns 110 are also contemplated, including, but not limited to, various types of other barcodes (e.g., one-dimensional barcodes, two-dimensional barcodes, linear barcodes, universal product codes (i.e., UPC), matrix barcodes, etc.), text, images, and icons. Other spatial patterns 110 are also contemplated.

In some embodiments, the spatial pattern 110 is unique, or the spatial pattern 110 comprises a unique pattern. A unique pattern (or a unique spatial pattern 110) can comprise a randomized arrangement of inks 112, 114 on the substrate 102. For example, the randomized arrangement of inks 112, 114 can comprise a randomized arrangement of color on a pixel-by-pixel basis through a portion of the spatial pattern 110. Pixels can refer to discrete units of ink disposed on discrete areas of a substrate 102. In some embodiments, the randomized arrangement of the inks 112, 114 can comprise a randomized arrangement of time-progression characteristics on a pixel-by-pixel basis throughout a portion of the spatial pattern 110. In still other embodiments, the unique pattern (or unique spatial pattern 110) can be unique to each printing.

If desired, one or more dates (e.g., time stamps) can also be encoded or otherwise disposed in the spatial pattern 110.

In some embodiments, for example, a date disposed in the spatial pattern 110 can correspond to a date on which the inks 112, 114 are disposed on the substrate 102. In some embodiments, a date can correspond to at least one of a manufacturing date of a product, a packaging date of a product, and an expiration date of a product. Other dates can also be encoded in the spatial pattern 110 as desired.

The disclosed identification systems 100 have various uses. For example, in some embodiments, the identification system 100 can provide information (e.g., identifying information) about the spatial pattern 110 or a product associated therewith. In some embodiments, information can be derived from the spatial pattern 110 at any time. In particular, evaluation and/or interpretation of the state of a characteristic of an ink 112, 114 and/or the spatial pattern 110 at a given time (e.g., a second time) can provide identifying information about the spatial pattern 110 and/or a product associated with the spatial pattern 110. In some embodiments, a spatial pattern 110 can be evaluated to verify the authenticity of a product. The identification system 100 can also comprise, or otherwise be configured as, a counterfeit protection system.

In some embodiments, interpretation of the state of a characteristic of the spatial pattern 110 at a second time comprises a comparison between the state of the characteristic of the spatial pattern 110 at the second time and the state of the characteristic of the spatial pattern 110 at a first time. In other embodiments, interpretation of a characteristic of the spatial pattern 110 comprises a comparison between the state of the characteristic of the spatial pattern 110 at a second time and a control image of how the state of the characteristic of the spatial pattern 110 should appear at the second time. In further embodiments, interpretation of the characteristic of the spatial pattern 110 comprises a comparison between the state of the characteristic of the spatial pattern 110 at a second time and a standard or control, such as an image or color. In yet other embodiments, interpretation of the state of the characteristic of the spatial pattern 110 at a second time comprises capturing an image of the spatial pattern 110 and submitting the image to a website. In some embodiments, the website can evaluate the spatial pattern 110 and provide information about the spatial pattern 110 (e.g., the date on which the spatial pattern 110 was printed).

In some embodiments, interpretation of the characteristic of the spatial pattern 110 can be done by a human, for example, through a visual evaluation. For instance, one can visually compare the state of the characteristic of the spatial pattern 110 at a given time with a standard or control image of how the characteristic of the spatial pattern 110 should look at the given time. The standard or control image can be obtained, for example, from a website. In some embodiments, the visual comparison is performed by merely looking at the spatial pattern 110 and the standard or control image with the naked eye. Enhancement mechanisms can also be used, including, but not limited to, lenses, magnifiers, polarizing lenses, etc.

In other embodiments, interpretation of the characteristic of the spatial pattern 110 comprises an evaluation by a computing device, including, but not limited to, a smart phone. For example, one can capture an image of the spatial pattern 110 with a computing device, such as a smart phone, and upload or otherwise submit the image to a website. The website can perform an evaluation of the image (e.g., by comparing it to a control image or formula, etc.) and provide identifying information about the spatial pattern 110. In some embodiments, the identifying information includes a date. The date can correspond to a date on which the spatial pattern 110 was disposed on the substrate 102. The date can also correspond to at least one of a manufacturing date of the product, a packaging date of the product, and an expiration date of the product. In some embodiments, the date can be used to authenticate the product.

In some embodiments, the identifying information obtained from the spatial pattern 110 comprises encoded information that changes over time, including, but not limited to, dosage related information. For example, in some embodiments, the spatial pattern 110 is disposed on a substrate 102 that is associated with a pharmaceutical medication. The efficacy, and thus recommended dosage, of the pharmaceutical medication can change over time as the medication ages. In such embodiments, the dosage information at any given time can be obtained by evaluating the spatial pattern 110. For example, evaluation of the state of a characteristic of the spatial pattern 110 at a first time can indicate a first dosage amount, and evaluation of the state of the characteristic of the spatial pattern 110 at a second time can indicate a second dosage amount. Further, evaluation of the state of the characteristic of the spatial pattern 110 at a third, fourth, fifth time, etc. can indicate a third, fourth, fifth dosage amount, etc. In some embodiments, the recommended dosage amount can change discontinuously, despite the state of the characteristic changing continuously, e.g., for values of the state of the characteristic between a first and a second value, the dosage is A, whereas for values of the state of the characteristic between the second and a third value, the dosage is B. As can be appreciated, the spatial pattern 110 can also be evaluated at any given time to determine the age of the pharmaceutical medication.

In certain embodiments, the spatial pattern 110 can comprise encoded information about a website. For example, in some embodiments, the spatial pattern 110 comprises a QR code. The QR code can be configured to direct a user to a particular website. In some embodiments, the spatial pattern 110 can change over time such that the QR code changes, and the user is directed to a different website. For example, the state of a characteristic of a QR code at a first time can direct a user to one website, and the state of the characteristic of the QR code at a second time can direct a user to another website, and so forth. Other types of information can also be encoded in the spatial pattern 110 as desired.

Figure 2A:
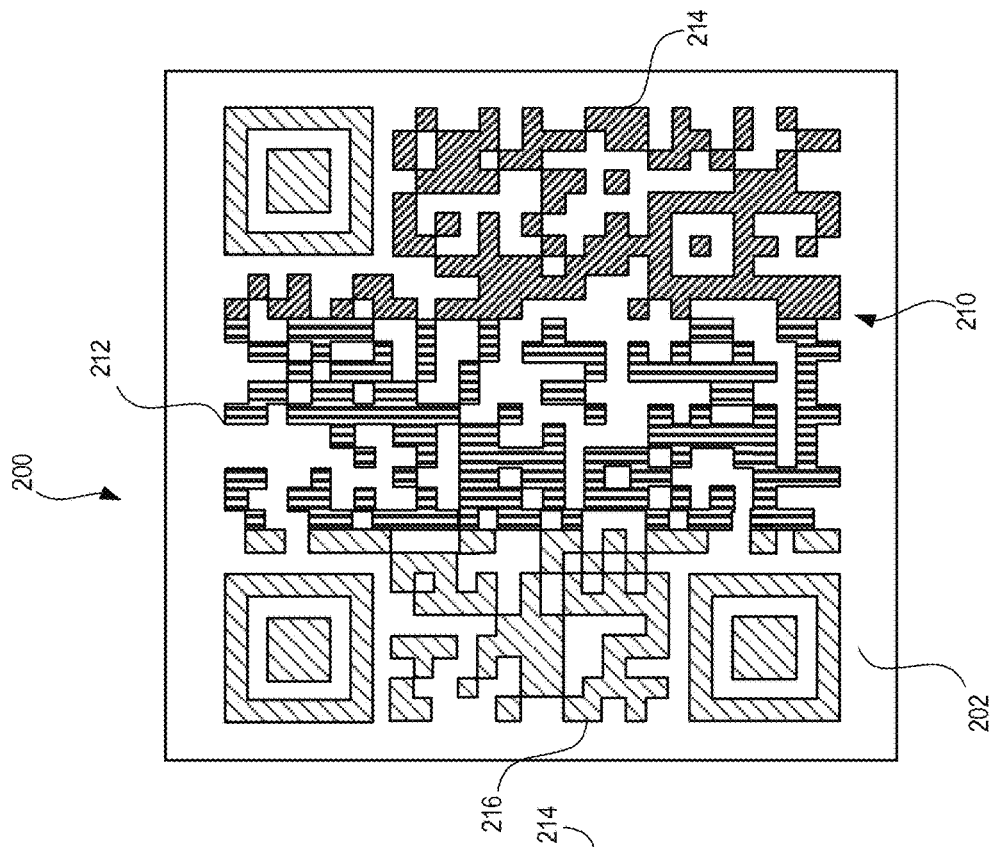
FIGS. 2A-2B are schematic illustrations of an identification system, according to another embodiment of the present disclosure.
Figure 2B:
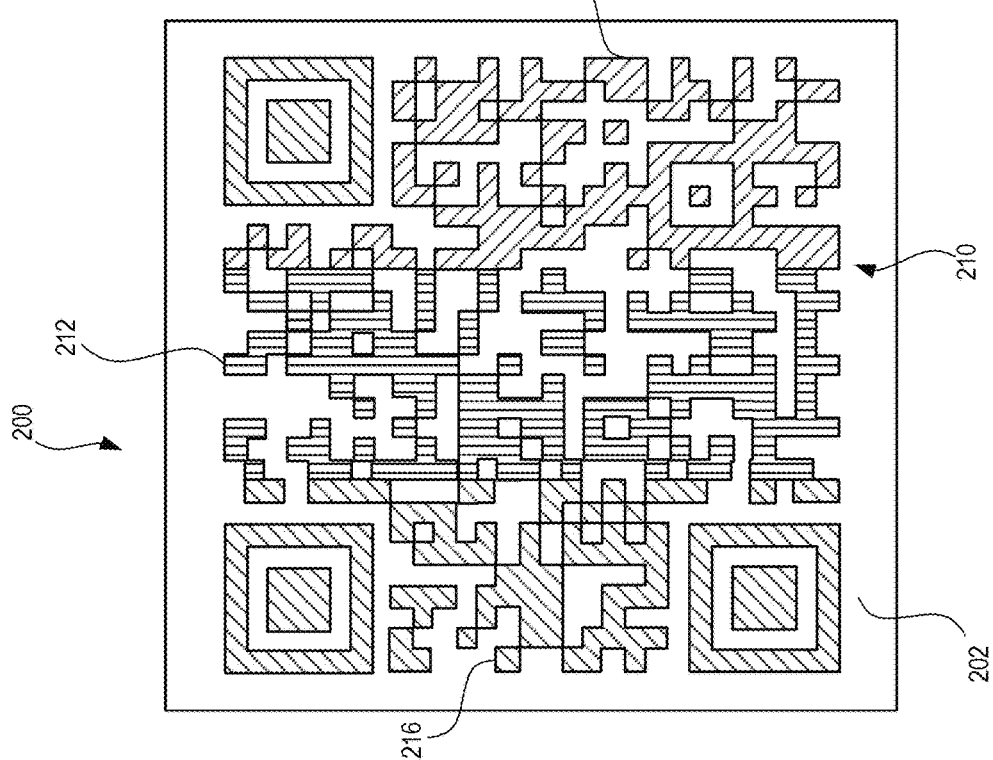

FIGS. 2A-2B are schematic illustrations of an identification system 200, according to another embodiment of the present disclosure. As shown in FIGS. 2A-2B, the identification system 200 can comprise a plurality of inks 212, 214 having time-dependent properties disposed in a spatial pattern 210 on a substrate 202. For example, the spatial pattern 210 comprises a first time-dependent ink 212 and a second time-dependent ink 214, which are analogous to the time-dependent inks 112, 114 disclosed above in relation to FIGS. 1A-1B.

As further shown in FIGS. 2A-2B, in some embodiments, the identification system 200 further comprises one or more reference inks 216. In some embodiments, the reference ink 216 can be used as a baseline reference, for example, in the interpretation of the spatial pattern 210. In some embodiments, the reference ink 216 can comprise a static ink that is substantially devoid of time-dependent properties. As can be appreciated, however, static inks can still change to a minimal degree over time, for example, due to aging of the ink 216 and/or the substrate 202. Static inks can also change due to various environmental conditions, including, but not limited to, humidity, temperature, pressure, etc. During or prior to evaluation of the spatial pattern 210, a static ink can be used (e.g., evaluated) to obtain a baseline for determining the changes that occurred to the time-dependent inks 212, 214.

In other embodiments, the reference ink 216 can comprise, or be used as, a color reference. For example, the reference ink 216 can comprise a certain color that does not substantially change over time. The color of the reference ink 216 can be used to compare with time-dependent inks 212, 214 that may change color to provide helpful information about the product.

In further embodiments, the reference ink 216 comprises a calibration ink. For example, the reference ink 216 can comprise temperature calibration inks. Temperature calibration inks can comprise known time- and temperature-dependent properties. Temperature calibration inks can also comprise known temperature coefficients. Temperature calibration inks can also be used to differentiate changes due to temperature from those due to time.

Temperature-related information can be derived from the calibration ink in many ways. For example, a computing device can evaluate the calibration at a second time and isolate temperature-related information from the calibration ink. The temperature-related information can then be subtracted from the time-dependent inks 212, 214 to minimize the effects of temperature on the changes to the time-dependent inks 212, 214.

In certain embodiments, the reference ink 216 comprises one or more anti-counterfeiting characteristics. Illustrative anti-counterfeiting characteristics include, but are not limited to, temperature sensitivities, moisture sensitivities, radiation sensitivities, and pressure sensitivities. In some embodiments, the anti-counterfeiting characteristics can comprise a characteristic that changes upon exposure to an abnormal environmental condition, or a condition that extends beyond a certain threshold. For example, the reference ink 216 can change upon exposure to a condition above or below a specified temperature, moisture, radiation, and pressure. In such embodiments, the reference ink 216 can indicate whether the spatial pattern 210 has been tampered with, for example, if the ink 216 has been exposed to increased temperatures in an effort to alter the time-dependent properties of the inks 212, 214.

In certain embodiments, the reference ink 216 can comprise one or more anti-counterfeiting characteristics that change upon exposure to a counterfeit detection test. For example, in some embodiments, a test compound can be applied to the spatial pattern 210 to determine whether the spatial pattern 210 is authentic. Illustrative test compounds can include, but are not limited to, powders, liquids, solvents, solids, and other reagents. When applied to the reference ink 216, the test compound can cause the reference ink 216 to change, either temporarily or permanently, to indicate the existence of the reference ink 216, an indication that the spatial pattern 210 is authentic. Upon exposure to a fraudulent or counterfeit spatial pattern, the test compound may not react, or may react differently, indicating that the spatial pattern and associated identification system are fraudulent.

It will also be appreciated that in some embodiments, a time-dependent ink 212, 214 can be used as a calibration ink, and/or an anti-counterfeiting ink, analogous to the reference ink 216 discussed above. Thus, the discussion re calibration inks and anti-counterfeiting inks can be in relation to a reference ink 216, and/or a time-dependent ink 212, 214.

Figure 3A:
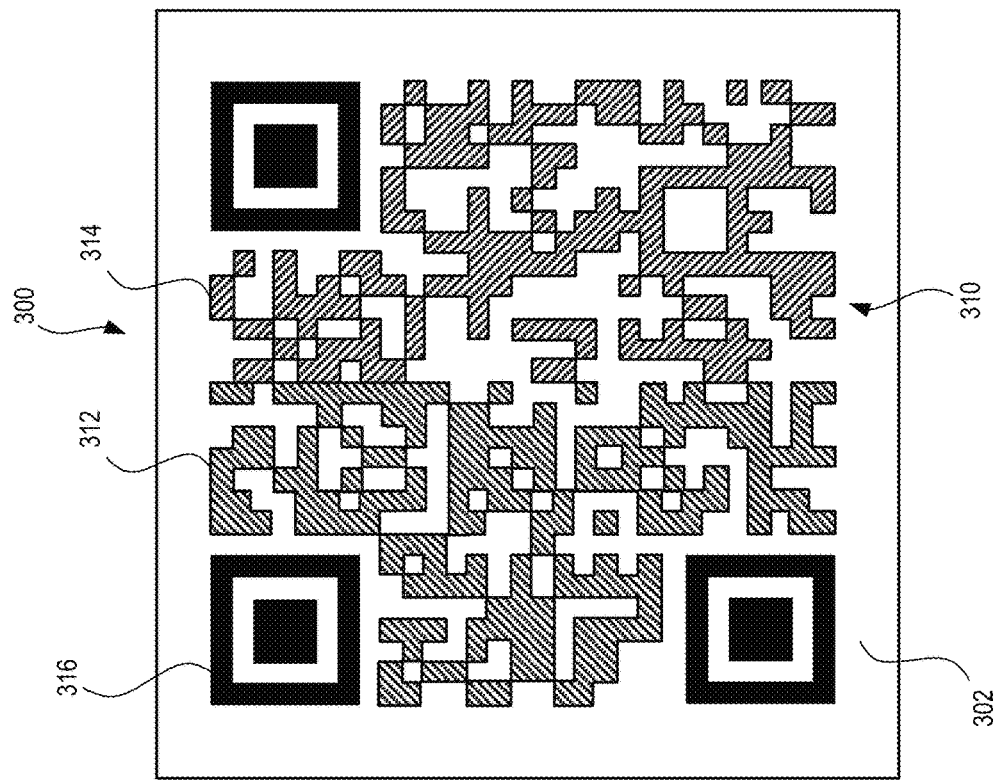
FIGS. 3A-3B are schematic illustrations of an identification system, according to another embodiment of the present disclosure.
Figure 3B:
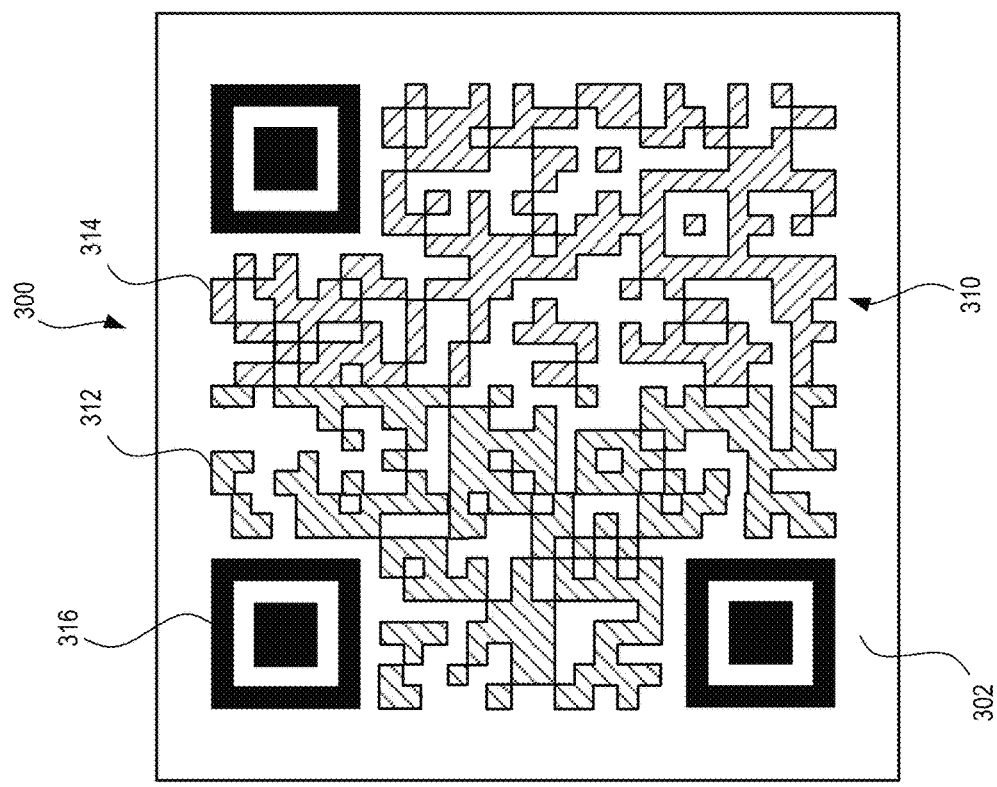

FIGS. 3A-3B are schematic illustrations of an identification system 300, according to another embodiment of the disclosure. As shown in FIGS. 3A-3B, the identification system 300 comprises a plurality of inks 312, 314 having time-dependent properties disposed in a spatial pattern 310 on a substrate 302. For example, the spatial pattern 310 comprises a first time-dependent ink 312, and a second time-dependent ink 314, which are analogous to the time-dependent inks 112, 114 disclosed above in relation to FIGS. 1A-1B.

As further shown in FIGS. 3A-3B, in some embodiments, the characteristic of the ink 312, 314 that is affected by the time-dependent property comprises location, such as a spatial location in the spatial pattern 310 on the substrate 302. For example, the ink 312, 314, or a portion thereof, can change locations over time, as shown in FIGS. 3A-3B. In FIG. 3A, the inks 312, 314 are disposed at one location at a first time to form a first QR code, and in FIG. 3B, the inks 312, 314 are disposed at a different location at a second time to form a second QR code. In such embodiments, a portion of the spatial pattern 310 can be described as being disposed at one location in a first state, and another location in a second state.

In certain embodiments, the inks 312, 314 can migrate from one location to another location on the substrate 302. U.S. Pat. No. 5,602,804, titled 'Long Term Rapid Color Changing Time Indicator,' filed Aug. 3, 1995 and U.S. Pat. No. 5,822,280, titled 'Long Term Rapid Color Changing Time Indicator Employing Dye Absorbing Layer,' filed May 6, 1996, each of which is incorporated by reference in its entirety, describe two different indicator systems based on migration of ink components relative to a substrate. The inks 312, 314 can migrate over time relatively quickly, or slowly, as desired. In some embodiments, the ink 312, 314 migrates via wicking through the substrate 302. In further embodiments, the characteristic of the ink 312, 314 changes over time due to migration of only a component of the ink 312, 314. For example, a liquid or aqueous component of the ink 312, 314 can migrate from one location to another, for example, by wicking through the substrate 302. In further embodiments, the characteristic of the ink 312, 314 changes from one state to another state because of migration of a component of another ink from one location to another. For example, a component of the second ink 314 can migrate and interact with a component of the first ink 312 in one location or another.

In some embodiments, the inks 312, 314 migrate at a different rate. In other embodiments, the inks 312, 314 migrate at substantially similar rates. The rate of migration of the inks 312, 314 can also be variable or otherwise capable of being varied or changed. For example, the rate of migration of an ink 312, 314 can be configured to be relatively fast, or relatively slow, depending on the desired use of the identification system 300.

The rate of migration of the ink 312, 314 can be varied by modifying one or more components of the ink 312, 314. For example, one or more reagents or other compounds can be added that can accelerate or decelerate the rate of migration. In some embodiments, the one or more components of the ink 312, 314 can be modified prior to disposing the ink 312, 314 on the substrate 302. In other embodiments, the one or more components of the ink 312, 314 are modified while the ink 312, 314 is being disposed on the substrate 302. For example, one or more components of the ink 312, 314 can be mixed with additional reagents or compounds while the ink 312, 314 is being disposed on the substrate 302. In yet other embodiments, one or more components of the ink 312, 314 can be modified after the ink 312, 314 has been disposed on the substrate 302. For example, a reagent or other compound can be applied to an ink 312, 314 that has previously been disposed on a substrate 302.

As can be appreciated, varying the rate of migration of an ink 312, 314 can vary the rate of change of a particular characteristic of the ink 312, 314 and/or the spatial pattern 310. For example, increasing the rate of migration of an ink 312, 314 can increase the rate of change of a characteristic of the ink 312, 314 and/or the spatial pattern 310. Analogously, decreasing the rate of migration of an ink 312, 314 can decrease the rate of change of a characteristic of the ink 312, 314 and/or the spatial pattern 310. In some embodiments, the rate of migration can be varied, or otherwise configured, such that a characteristic of an ink 312, 314 and/or the spatial pattern 310 changes to a particular state on a predetermined date, for example, to authenticate a product or indicate that an expiration date has passed.

As further shown in FIGS. 3A-3B, in some embodiments, the identification system 300 further comprises one or more reference inks 316. As discussed above, the reference ink 316 can be used as a baseline reference for interpretation of the spatial pattern 310. In some embodiments, the reference ink 316 can be a non-migrating ink, such that it remains disposed in one location while the time-dependent inks 312, 314 move over time.

In some embodiments, the spatial pattern 310 changes such that it can direct a user to a particular website at a particular time. For example, as shown in FIGS. 3A-3B, the spatial pattern 310 can comprise a QR code. In FIG. 3A, the spatial pattern 310 is disposed in a first QR code and can direct a user to one website, and in FIG. 3B, the spatial pattern 310 is disposed in a second QR code and can direct a user to a different website.

Figure 4:
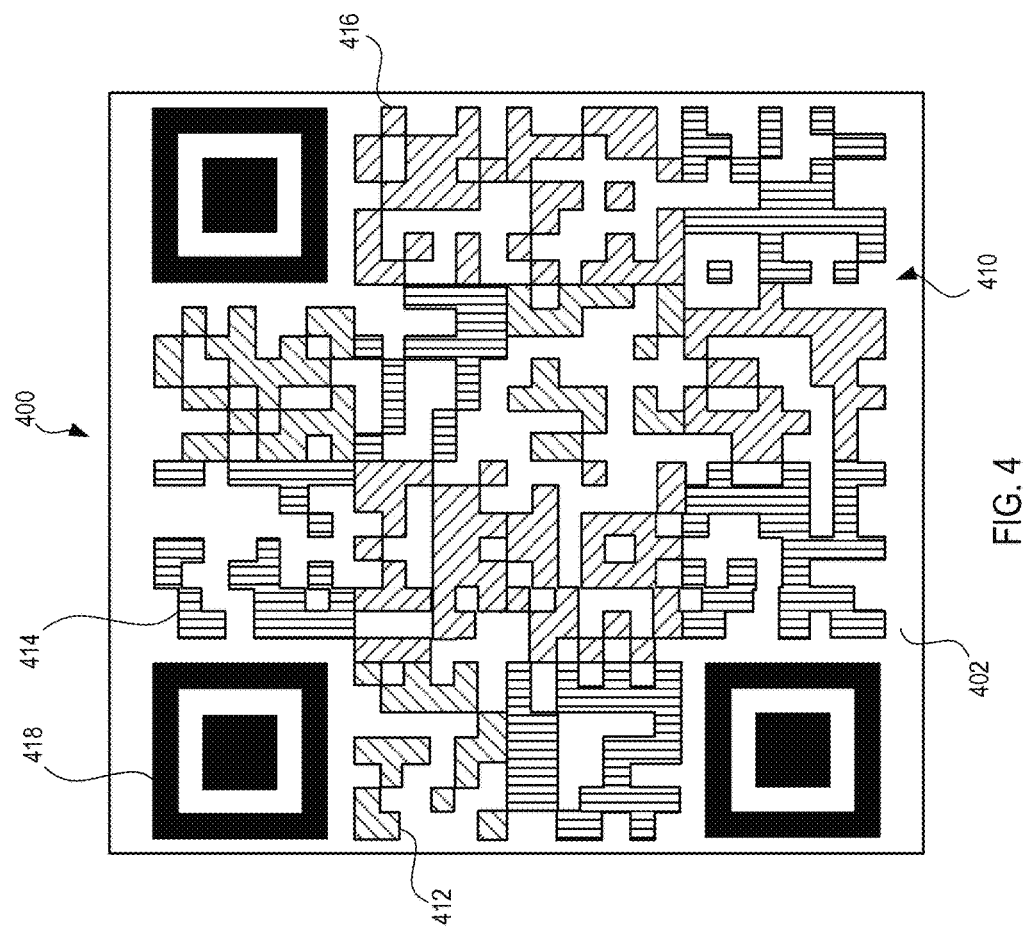
FIG. 4 is a schematic illustration of an identification system, according to another embodiment of the present disclosure.

FIG. 4 is a schematic illustration of an identification system 400, according to another embodiment of the disclosure. As shown in FIG. 4, the identification system 400 comprises a plurality of inks 412, 414 having time-dependent properties disposed in a spatial pattern 410 on a substrate 402. For example, the spatial pattern 410 comprises a first time-dependent ink 412, and a second time-dependent ink 414, which are analogous to the time-dependent inks 112, 114 disclosed above in relation to FIGS. 1A-1B. In some embodiments, the spatial pattern 410 further comprises a third time-dependent ink 416, which can also be analogous to the time-dependent inks 112, 114 disclosed above in relation to FIGS. 1A-1B. In some embodiments, such as the illustrated embodiment of FIG. 4, the identification system 400 further comprises a reference ink 418 that is substantially devoid of time-dependent properties.

Figure 5B:
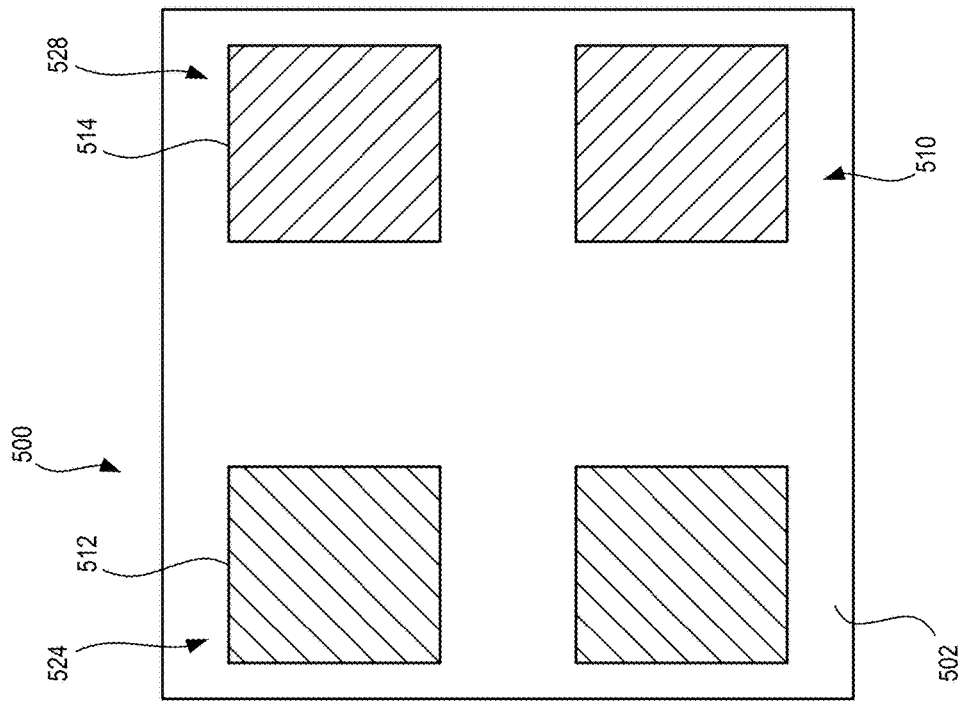
FIGS. 5A-5B are schematic illustrations of an identification system, according to another embodiment of the present disclosure.
Figure 5A:
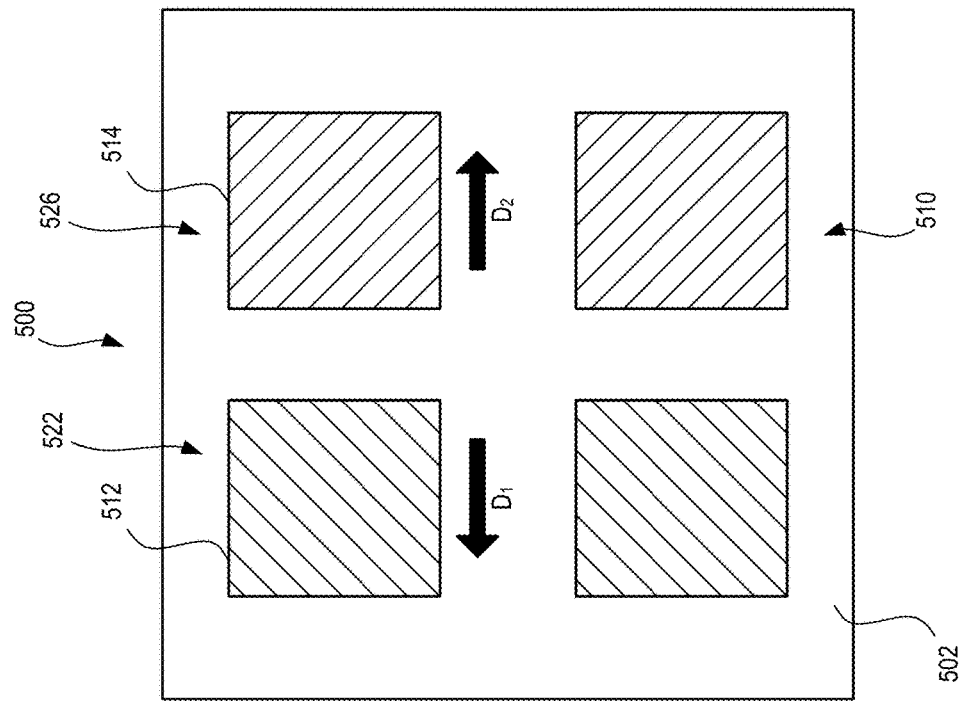

FIGS. 5A-5B are schematic illustrations of an identification system 500, according to another embodiment of the disclosure. As shown in FIGS. 5A-5B, the identification system 500 comprises a plurality of inks 512, 514 having time-dependent properties disposed in a spatial pattern 510 on a substrate 502. For example, the spatial pattern 510 comprises a first time-dependent ink 512, and a second time-dependent ink 514, which are analogous to the time-dependent inks 112, 114 disclosed above in relation to FIGS. 1A-1B.

As shown in FIGS. 5A-5B, various types of spatial patterns 510 can be employed. For example, in FIGS. 1A-1B, 2A-2B, 3A-3B, and 4, the spatial patterns 110, 210, 310, 410 were generally in the form of a QR code. In FIGS. 5A-5B, the spatial pattern 510 can be representative of another barcode, an image, an icon, or another type of spatial pattern 510.

Further, as shown in FIGS. 5A-5B, the first and second inks 512, 514 can migrate over time. For example, in FIG. 5A, a first ink 512 (or a portion thereof) is disposed at a first location 522, and a second ink 514 (or a portion thereof) is disposed at a second location 526. As indicated by the reference arrows, D1 and D2, the inks 512, 514 (or portions thereof) can migrate over time to a different location on the substrate 502, as illustrated in FIG. 5B. In FIG. 5B, the first ink 512 (or a portion thereof) has moved to a new location 524, and the second ink 514 (or a portion thereof) has moved to a new location 528. In some embodiments, the distance the inks 512, 514 have moved can be evaluated to determine information about the spatial pattern 510, e.g., information such as the date on which the spatial pattern 510 was disposed on the substrate 502.

Figure 6A:
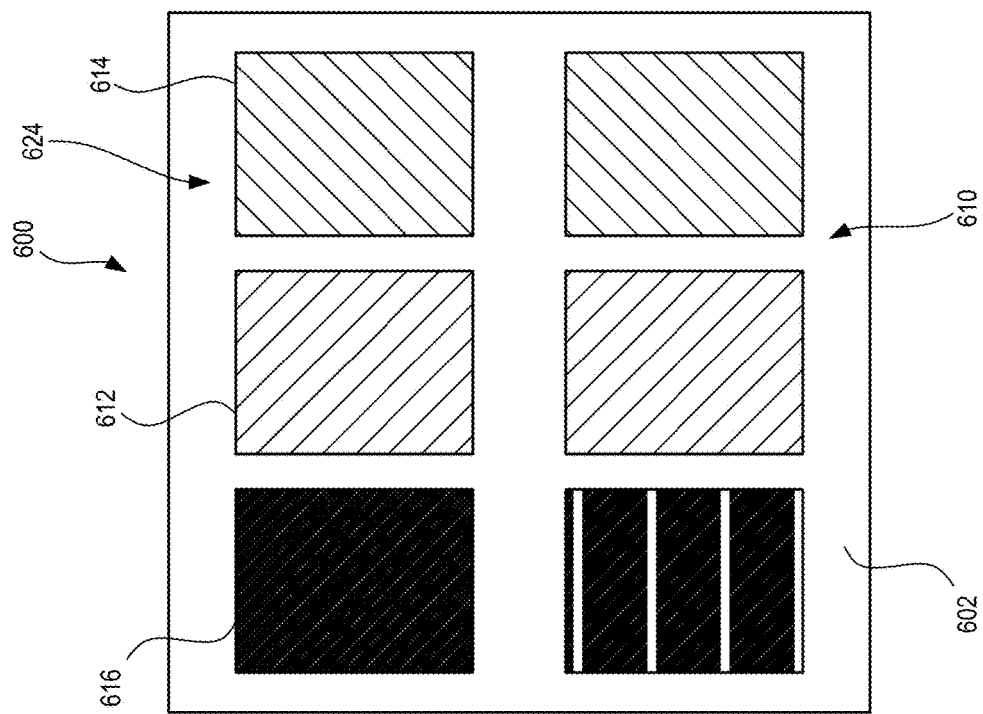
FIGS. 6A-6B are schematic illustrations of an identification system, according to another embodiment of the present disclosure.
Figure 6B:
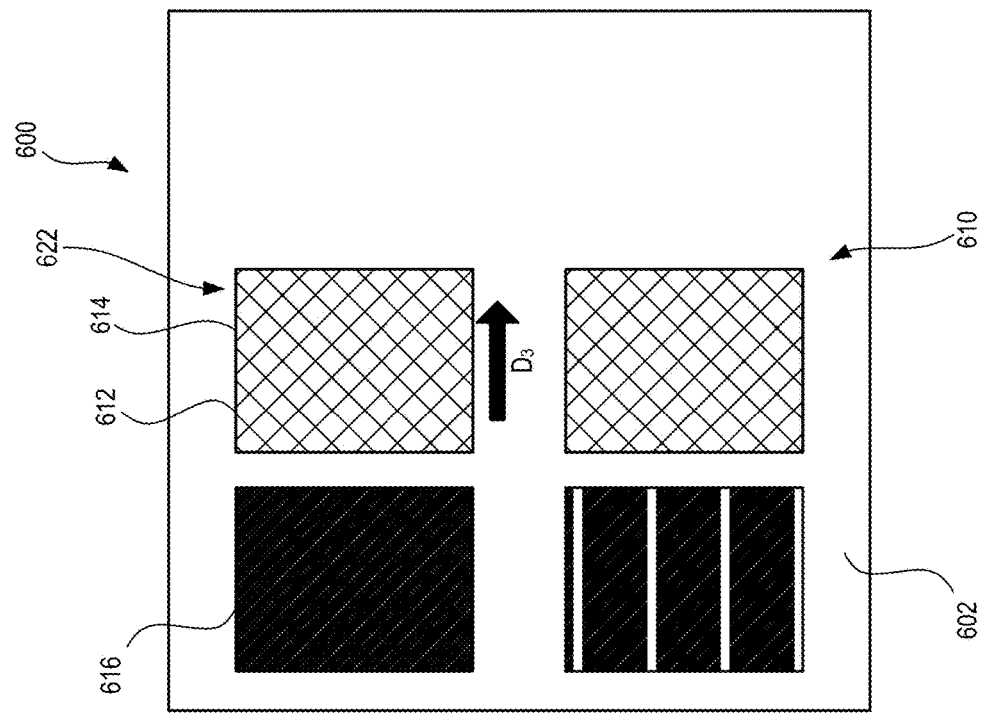

FIGS. 6A-6B are schematic illustrations of an identification system 600, according to another embodiment of the disclosure. As shown in FIGS. 6A-6B, the identification system 600 comprises a plurality of inks 612, 614 having time-dependent properties disposed in a spatial pattern 610 on a substrate 602. For example, the spatial pattern 610 comprises a first time-dependent ink 612, and a second time-dependent ink 614, which are analogous to the time-dependent inks 112, 114 disclosed above in relation to FIGS. 1A-1B. The spatial pattern 610 further comprises a reference ink 616 that is substantially devoid of time-dependent properties.

As shown in FIG. 6A, in some embodiments, the first and second inks 612, 614 can be disposed at a substantially similar location 622 on the substrate 602. Further, one or more of the inks 612, 614 can be configured to migrate over time, as indicated by the reference arrow D3. In FIG. 6B, the second ink 614 has migrated to a new location 624 at a second time such that it is no longer disposed in the same spatial location as the first ink 612. An evaluation of the inks 612, 614 can then provide identifying information about the spatial pattern 610.

Methods for labeling a substrate with an identification system are also provided herein. In particular, it is contemplated that any of the components, principles, and/or embodiments discussed above may be utilized by either a system or a method. For example, in an embodiment, a method for labeling a substrate may comprise a step of disposing a first ink comprising a time-dependent property and a second ink comprising a time-dependent property onto the substrate, wherein the first and second inks are disposed onto the substrate to form a spatial pattern. The time-dependent property of the first ink and the time-dependent property of the second ink can cause a characteristic of the spatial pattern to change from a first state at a first time to a second state at a second time. Further, in some embodiments, the characteristic of the spatial pattern in the second state can provide identifying information about the spatial pattern and/or a product associated with the spatial pattern. Additional steps, and/or methods, can also be employed.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment.

The claims following this written disclosure are hereby expressly incorporated into the present written disclosure, with each claim standing on its own as a separate embodiment. This disclosure includes all permutations of the independent claims with their dependent claims. Moreover, additional embodiments capable of derivation from the independent and dependent claims that follow are also expressly incorporated into the present written description.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An identification system, comprising:
a first ink comprising a time-dependent property; and
a second ink comprising a time-dependent property;
the first ink and the second ink being disposed in a spatial pattern on a substrate;
wherein the time-dependent property of the first ink and the time-dependent property of the second ink cause a characteristic of the spatial pattern to change from a first state at a first time to a second state at a second time, wherein the characteristic is selected from the group consisting of color, reflectivity, and location;
wherein interpretation of the characteristic of the spatial pattern in the second state provides identifying information about a product.

2. The system of claim 1, wherein the identification system comprises a counterfeit protection system.

3. The system of claim 1, wherein the time-dependent property of the first ink differs from the time-dependent property of the second ink.

4. The system of claim 1, wherein the time-dependent property of the first ink causes a characteristic of the first ink to change from a third state at the first time to a fourth state at the second time, and wherein the time-dependent property of the second ink causes a characteristic of the second ink to change from a fifth state at the first time to a sixth state at the second time.

5. The system of claim 1, wherein the characteristic of the first ink comprises color.

6. The system of claim 5, wherein the color of the first ink in the third state differs from the color of the first ink in the fourth state.

7. The system of claim 5, wherein the first ink comprises a first color in the third state and a second color in the fourth state.

8. The system of claim 7, wherein at least one of the first color and the second color comprises a visible color.

9. The system of claim 7, wherein at least one of the first color and the second color comprises a non-visible color.

10. The system of claim 7, wherein at least one of the first color and the second color comprises a visible color, and wherein at least one of the first color and the second color comprises a non-visible color.

11. The system of claim 1, wherein the characteristic of the first ink comprises reflectivity.

12. The system of claim 11, wherein the first ink comprises a first reflectivity in the third state and a second reflectivity in the fourth state.

13. The system of claim 12, wherein the first reflectivity is greater than the second reflectivity.

14. The system of claim 12, wherein the first reflectivity has a greater specular component than the second reflectivity.

15. The system of claim 12, wherein the first reflectivity has a greater diffuse component than the second reflectivity.

16. The system of claim 12, wherein the first reflectivity has a greater diffractive component than the second reflectivity.

17. The system of claim 12, wherein the first reflectivity has a different polarization dependence than the second reflectivity.

18. The system of claim 12, wherein the second reflectivity is greater than the first reflectivity.

19. The system of claim 12, wherein the second reflectivity has a greater specular component than the first reflectivity.

20. The system of claim 12, wherein the second reflectivity has a greater diffuse component than the first reflectivity.

21. The system of claim 12, wherein the second reflectivity has a greater diffractive component than the first reflectivity.

22. The system of claim 1, wherein the characteristic of the first ink comprises location.

23. The system of claim 22, wherein the location comprises a spatial location in the spatial pattern.

24. The system of claim 22, wherein a first portion of the first ink is disposed at a first location in the third state, and the first portion of the first ink is disposed at a second location in the fourth state.

25. The system of claim 24, wherein the first portion of the first ink migrates from the first location to the second location between the first time and the second time.

26. The system of claim 25, wherein the first portion of the first ink migrates from the first location to the second location via wicking through the substrate.

27. A method of labeling a substrate, comprising:
disposing a first ink comprising a time-dependent property onto the substrate; and
disposing a second ink comprising a time-dependent property onto the substrate;
wherein the first ink and the second ink are disposed onto the substrate to form a spatial pattern;
wherein the time-dependent property of the first ink and the time-dependent property of the second ink cause a characteristic of the spatial pattern to change from a first state at a first time to a second state at a second time, wherein the characteristic is selected from the group consisting of color, reflectivity, and location;
wherein the characteristic of the spatial pattern in the second state provides identifying information about a product.

28. The method of claim 27, wherein the time-dependent property of the first ink differs from the time-dependent property of the second ink.

29. The method of claim 27, wherein the time-dependent property of the first ink causes a characteristic of the first ink to change from a third state at the first time to a fourth state at the second time, and wherein the time-dependent property of the second ink causes a characteristic of the second ink to change from a fifth state at the first time to a sixth state at the second time.

30. The method of claim 27, wherein the characteristic of the first ink comprises color.

31. The method of claim 30, wherein the color of the first ink in the third state differs from the color of the first ink in the fourth state.

32. The method of claim 30, wherein the characteristic of the first ink comprises a first color in the third state and a second color in the fourth state.

33. The method of claim 27, wherein the characteristic of the first ink comprises reflectivity.

34. The method of claim 33, wherein the characteristic of the first ink comprises a first reflectivity in the third state and a second reflectivity in the fourth state.

35. The method of claim 34, wherein the first reflectivity is greater than the second reflectivity.

36. The method of claim 34, wherein the second reflectivity is greater than the first reflectivity.

37. The method of claim 27, wherein the characteristic of the first ink comprises location.

38. The method of claim 37, wherein the location comprises a spatial location in the spatial pattern.

39. The method of claim 37, wherein a first portion of the first ink is disposed at a first location in the third state and wherein the first portion of the first ink is disposed at a second location in the fourth state.

40. The method of claim 39, wherein the first portion of the first ink migrates from the first location to the second location between the first time and the second time.

41. The method of claim 40, wherein the first portion of the first ink migrates from the first location to the second location via wicking through the substrate.

* * * * *